Aug. 31, 1937.  S. STEUERMANN  2,091,293
PROCESS FOR INTRODUCING LIQUIDS INTO LOOSE MATERIAL
Filed Jan. 29, 1934  2 Sheets-Sheet 2
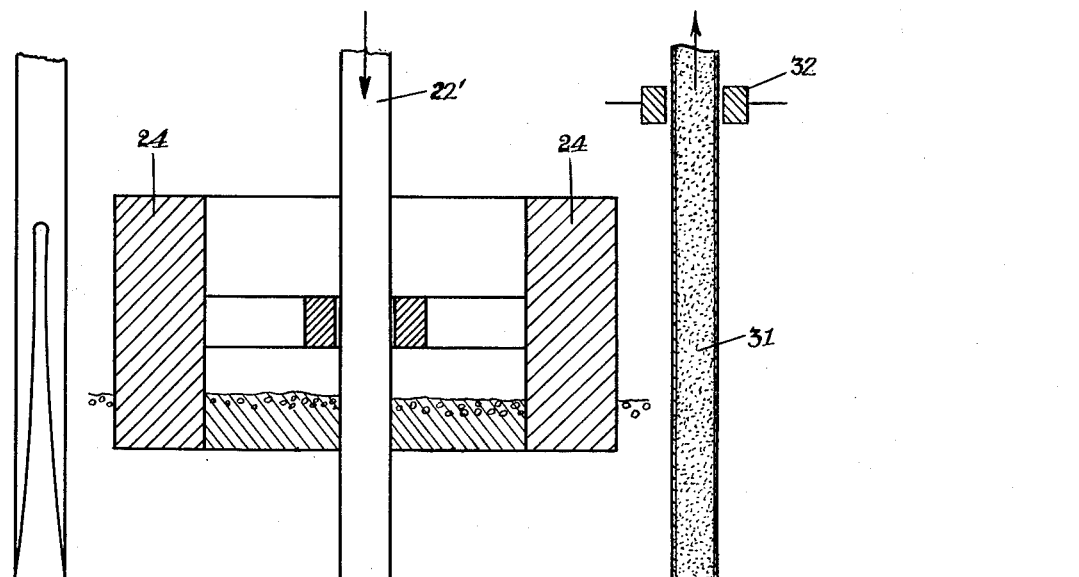
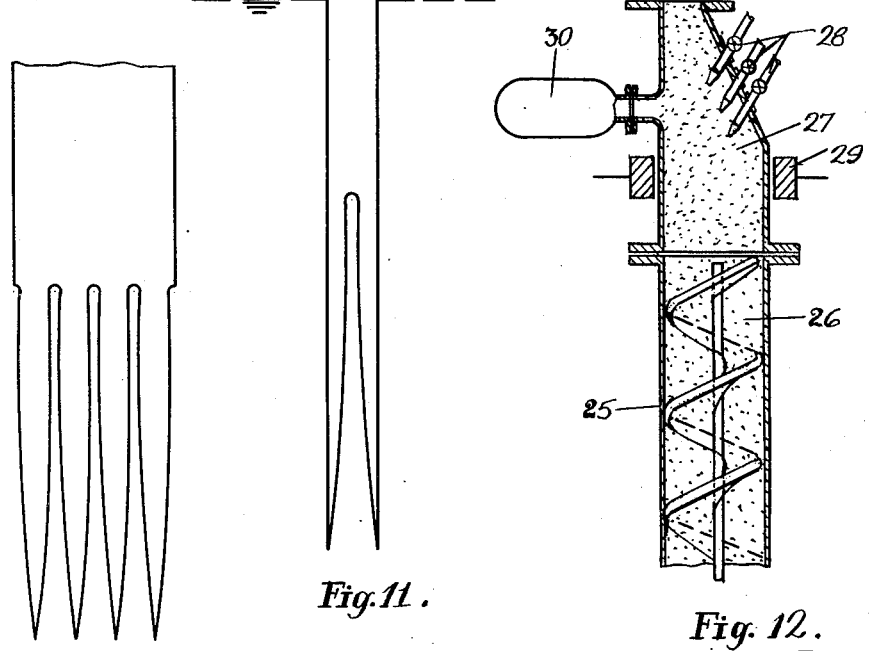
Fig. 9.
Fig. 10.
Fig. 11.
Fig. 12.
Inventor:
Sergey Steuermann

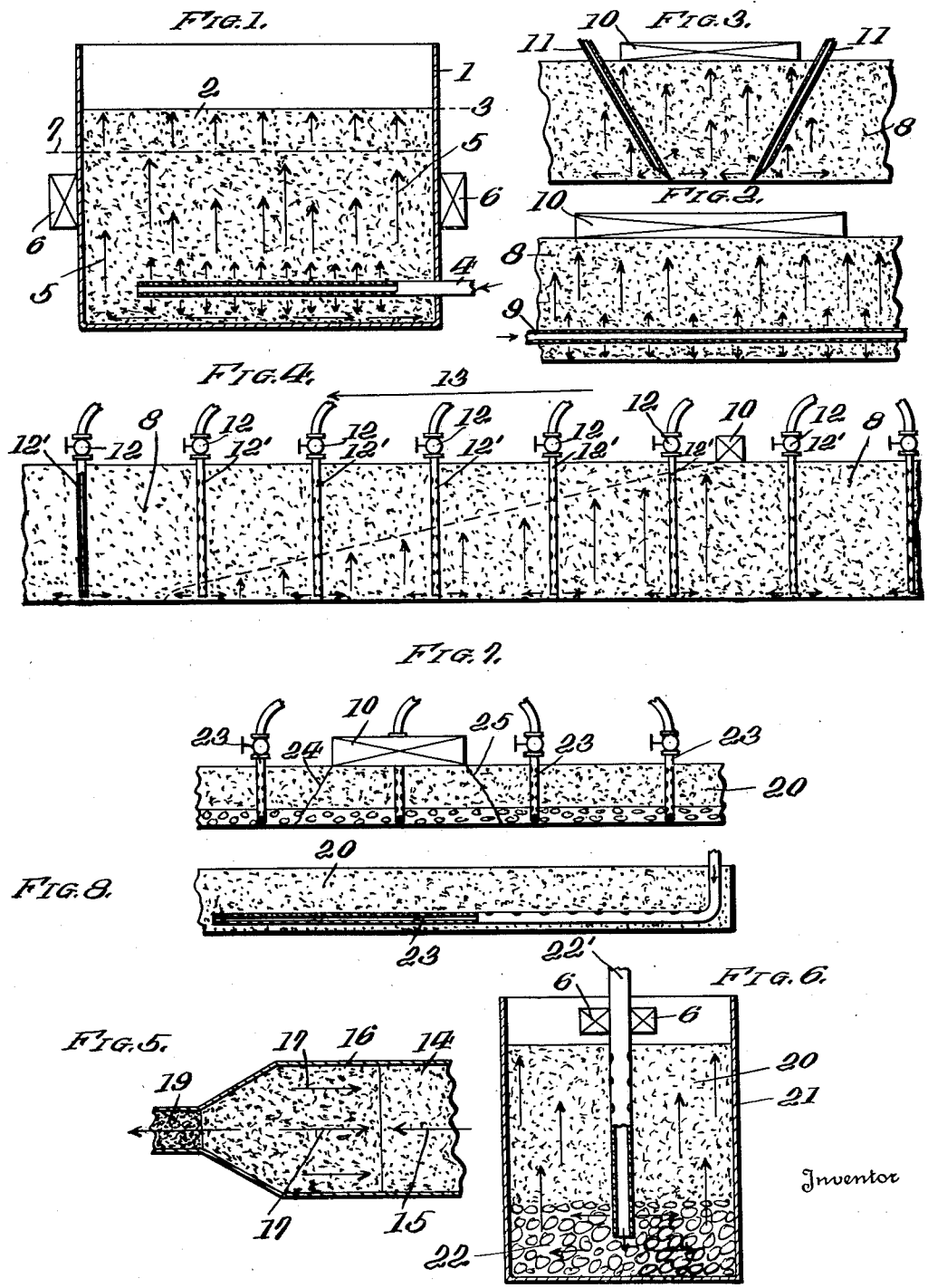

UNITED STATES PATENT OFFICE 2,091,293

PROCESS FOR INTRODUCING LIQUIDS INTO LOOSE MATERIAL

Sergey Steuermann, Berlin-Wilmersdorf, Germany

Application January 29, 1934, Serial No. 708,920
In Germany February 16, 1933

6 Claims. (Cl. 61—50)

My invention relates to a process for the production of mixtures between loose materials consisting of solid granules and liquids, and these for the most diverse structural purposes.

The process according to my invention resides essentially in that by means of mechanical auxiliary means known per se, the loose material is vibrated, and simultaneously a liquid is introduced into the loose material in such manner that the liquid penetrates in uniform flow against whatever force is acting on the material, usually the force of gravity, and permeates the material until a mixture is obtained in which the loose material is completely permeated by the liquid, the mixture in its entirety then being of a paste-like fluid consistency and the granules contained therein having settled to a minimum volume.

The favorable effect of my new process is based on similar physical processes which are called into use when the current of liquid passes through a loose material from the bottom upwardly, or, in general, against the force acting on the material on the one hand, and when a loose material is vibrated on the other hand. Under the action of the pressure of flow of the rising liquid, the internal static friction of the material is reduced to the very much smaller hydrodynamic friction so that the granules of the material tend to become suspended. In a very similar manner individual granules of a loose material pass into a kind of condition of suspension under the action of vibration with continuous impacting and rebounding. This state of suspension is increased very considerably if the two operations are combined, i. e., if at the same time a current of liquid is allowed to pass up through the material and the material is vibrated. The pressure of flow of the liquid increases the action of the vibration, and in turn the vibration increases the action of the pressure of flow. There results a completely labile structure of the material, the material is completely permeated by the liquid, and the resulting mixture has the properties of a liquid and contracts to a minimum volume.

By the utilization of any or all properties of the final mixture thus obtained, and by suitable choice of the media treated, i. e., of the material consisting of solid granules and the liquids, it is possible to obtain mixtures for the most diverse uses for structural purposes; and measures dependent upon the properties of the particular mixture to be utilized in certain cases can be employed in a particularly advantageous manner.

In the accompanying drawings,

Figs. 1-4 are schematic sections showing different methods of producing a paste-like mixture according to my process.

Fig. 5 is a section showing the ready conveyance of excavated material according to my process.

Fig. 6 is a section showing the manner in which concrete is poured in place, according to the invention.

Figs. 7 and 8 are transverse and longitudinal sections, respectively, through another example of concrete producing according to my invention.

Figs. 9 and 10 are a side view and development, respectively, of a nozzle according to my invention, for preventing blockage of viscous materials in the liquid-supply tubes.

Fig. 11 is a view, partly in section and partly in elevation, of a tube and nozzle construction, having a vibrator unitary therewith.

Fig. 12 shows, partly in section and partly in elevation, a combined mixing and conveying apparatus for materials such as concrete:

According to Fig. 1 loose material 2, e. g., sand, is introduced into the vessel 1 up to the level 3, and liquid is introduced under moderate pressure through the tube 4 at the bottom of the vessel so as to spread over the entire surface of the base. It then rises through the material in a flow 5. The liquid rises during the simultaneous vibration of the material by means of a vibrator 6 rigidly connected to the vessel. As soon as the rising liquid reaches the surface of the material so that the entire material has been traversed by liquid and at the same time is subjected to vibration, then the object of the process is attained. The material is permeated by the liquid and constitutes with it a mixture of paste-like fluidity. The material contracts or settles under the action of the vibration. The line 7 shows the thickness after settling has occurred.

This process occurs in its fundamental form in all cases in which my new process is utilized, and as already mentioned, the resulting properties of the mixture or of its components are utilized in accordance with the particular circumstances.

For utilizing the compacting which can be attained by my process, it is possible for example to apply the process to the compacting of built-up dams in order to avoid subsequent settling and also to increase the water-tightness thereof. These operations are important not only for modern road construction, e. g., for motor roads, but also for work in or near water, e. g., erection of weirs, dams and the like. The built-up earth constituting the loose material is subjected in layers to the process in progressive stages, the water which is employed as liquid either draining away or evaporating when the process is completed.

If apart from the compacting of the loose material resulting from the settling it is also desired to attain an increased resistance of a dam to the passage of water, then trass, stone meal, clay and like materials can be added to the water, which materials remain in the pores of the dam after the compacting, whereas the water evaporates.

The tubes for introducing the water are either placed horizontally under the layer or they are introduced into the layer in an oblique direction from above and are provided at their ends with fine apertures for the emergence of the water.

Fig. 2 shows by way of example a layer 8 of a dam under construction. Disposed beneath the layer is a tube 9 through which the water may pass under moderate pressure through numerous apertures into the loose soil. Disposed above the tube on top of the layer is a vibrator bar 10. Water is introduced into the layer through the tube and the material is simultaneously vibrated by the vibrator bar. As a result the water rises up in the region subjected to the vibration and the material in the vicinity of the vibrator bar is compacted and settles.

Fig. 3 shows the same example of a layer 8 of a dam, but having instead of a tube disposed beneath the layer, tubes 11 extending obliquely into the layer from above, from which tubes the water passes through the fine apertures provided at the lower end into the loose soil. The vibrator bar 10 is disposed on top of the layer between the two tubes. Under the action of the vibration the water penetrating into the layer at the bottom at the ends of the pipes rises to the top and in this way the built-up material in the vicinity of the vibrator bar is compacted. It is found to settle at the moment the rising water reaches the surface of the built-up material.

Fig. 4 is a longitudinal section corresponding to Fig. 3 through the same layer 8 of the dam, a large number of pairs of conduits 12 being spaced from each other at distances approximately equal to the thickness of the layer. In the examples according to Fig. 4, water is simultaneously introduced into the layer from five pairs of conduits 12' and at the commencement of the process the vibrator bar 10 is located in the vicinity of the first pair. The water rises most quickly under the action of the vibration in the vicinity of the vibrator bar and less quickly at increasing distances from the vibrator bar. It first reaches the surface of the layer at the vibrator bar and at the same moment the built-up material settles to a minimum volume. The vibrator bar is then moved forwardly in the direction of the arrow 13 and there again the result of the process is obtained in a small space of time. At the same time the supply of water to the first pair of conduits is cut off and a further pair of conduits is connected at the front. In this way it is possible to advance progressively, disconnecting the rearward conduits and connecting new conduits at the front, so that considerable lengths of a layer of a dam can be subjected to the process and compacted.

In all these operations, the water rises up definitely in the region subjected to the vibration, and it does not escape prematurely to one side and also does not sink downwardly. Due to the vibration the easiest and shortest path to the top is made available to the water. The compacting of the built-up material is attained and the process is carried out without the necessity of enclosing the material in the vicinity of the vibrator bar by separate means (metal plates for instance).

The compacting of built-up dams and of building sites in accordance with the present process is very much more effective than the other processes hitherto known. More particularly, it is more effective than mere vibration, or saturation with water.

The expression loose material wherever it occurs in the description and claims is to be understood as including any material which comes into use for this purpose and thus includes gravel, sand, ballast or chippings in varying degrees of granulation and size, as well as any mixtures thereof.

The fluid property of mixtures treated in accordance with the invention also affords the possibility of great simplification of the conveyance of such mixtures, and enables the conveyance, in closed conduits and in simple manner, of excavated material for example, or of a freshly mixed concrete in a paste-like fluid condition.

While it has been stated that it is possible to use water or cement paste in carrying out the process of this invention, it is obvious that any liquid may be used in place of water and any binding liquid may take the place of cement paste. Those skilled in the art will readily appreciate such possibilities.

As represented schematically in Fig. 5, excavated material 14 can for example be passed continuously through a vessel 16, which surrounds it, in the direction of motion 15, the material 14 being subjected to vibration in this vessel and to the simultaneous passage of a counter-current of water 17; and the resulting paste-like liquid mixture is conveyed, its condition of motion being maintained in a continuous stream 18 through a connected pipe line 19.

This process, in which the excavated material is first brought into the paste-like condition and is then conveyed through closed pipe lines, is differentiated from the usual application of the process according to my invention in that the relative motion between the loose material and the liquid does not occur in the vertical direction but rather, occurs in an arbitrarily chosen direction, and the entire process is positively carried out in a vessel. This process is not to be confused with the known hydraulic processes in which excavated material is carried away through pipe lines under the action of the tractional force of a very powerful current of water, in which case in contradistinction to the process according to my invention, the water does not move in counter-current to the direction of motion of the excavated material, but rather, moves in the same direction as the excavated material.

A similar procedure is adopted when it is desired to utilize the process for preparing and conveying fresh concrete. In this case there is not only the utilization of the paste-like fluidity of the mixture resulting from the process for the conveyance of the mixture, but the property of complete permeation is also utilized in order to obtain the mix. In a manner analogous to the example according to Fig. 5, concrete aggregate is fed continuously to a vessel and is passed therethrough. In the passage through the vessel the aggregate is vibrated, while simultaneously a stream of cement paste is directed through it in counter-current. At the other end of the vessel the resulting paste-like fresh concrete (still in motion) is transferred to a pipe line and is conveyed therethrough to the point of utilization.

Effects desirable in particular cases can be attained by utilizing the process in accordance with the invention, if the mixture is produced with liquids which remain in the pores of the loose material and are transformed into a solid state and bind the granules of the material to form a unitary solid body.

The utilization of the process for the production of concrete bodies of all kinds directly in situ is important, particularly for the production of concrete under water. The fundamental procedure is that, in accordance with the example of Fig. 6, aggregate 20 is introduced into the site 21 and cement paste is introduced from below into the aggregate through a conduit tube 22' in such manner that from the very start the cement paste spreads out under the entire surface of the aggregate and thence rises upwardly in a uniform current under the action of a moderate pressure together with the simultaneous vibration of the aggregate set up by the superimposed vibrator 6. Cement paste is normally a comparatively viscous liquid. In accordance with the fineness of the granules of the aggregate, it is in consequence necessary to make special provision in order that the cement paste actually spreads out over the lower surface of the aggregate. This can be effected in a particularly simple manner simply by forming the lowermost layer 22 of the aggregate of coarse gravel.

In Fig. 6 the conduit tube for introducing the cement paste is introduced vertically into the aggregate from above. This is the normal arrangement in the case of tall concrete bodies (pillars, piles). In these cases layers are worked in superposition, the vibrator and the conduits being moved from layer to layer.

It is also possible to utilize an apertured tube 23 disposed beneath the aggregate for introducing the cement paste, as shown in the example of Fig. 7 (cross section), Fig. 8 (longitudinal section). This is the most suitable arrangement for producing flat bodies (plates, street surface). In such cases it is preferable to work in layers side by side, and where possible, to effect the simultaneous introduction of cement paste with vibration of the aggregate by the vibrator 10 only in the region 24—25, surrounding each cement paste tube 23. No special bounding means are placed between the individual sections. The cement paste does not flow laterally. It flows cleanly in the upward direction in the region subjected to the vibration and only in this region, and if the violence of vibration in the adjacent section is adequate the sections grow together to form a unitary body.

Experiments have shown that with the process according to the invention it is also possible to prepare concrete under water with remarkable success. The cement paste rising through the aggregate expels all the water therethrough in the upward direction.

For carrying out the process in accordance with the invention, it is possible for the devices known as such for the individual measures to be utilized, and more particularly it is possible to use vibrators of known kind. The material can be vibrated in known manner either by surface vibration or by internal vibration, or the vibration may be effected indirectly by securing the vibrator to rigid members which either embrace the material or are introduced into the interior thereof.

The liquid is introduced through suitable conduits with corresponding nozzles. As the use of thick liquids can readily lead to stoppage either of the tube through which the liquid is supplied or of its outlet, i. e., the nozzle, it is advisable to utilize a special nozzle, the aperture of which is so shaped that blockages which begin to form are automatically removed by the outflowing liquid. The characteristic form of a cement paste nozzle serving this purpose is represented in side view in Fig. 9 and in development of Fig. 10. The outlet apertures of this nozzle consist of slots in the wall of the tube, which slots are very narrow at the top and enlarge downwardly to such an extent that finally the entire periphery of the tube is exposed. If for example sand penetrates into one of the slots so that a blockage is initiated thereby, nevertheless the upper narrower part of the slot remains free for the emergence of cement paste, and the cement paste which then emerges under pressure immediately removes the obstruction from the progressively widening lower part of the slot.

In many practical cases it is advisable to unite the vibrator with the nozzle to form a single appliance. This is particularly the case where the space in which the work is being performed is very narrow, and where it is important that the vibrator and the nozzle remain at a definite distance during the entire duration of the operation, and that the vibrator and the nozzle be raised simultaneously as the layer is permeated. Such a combined appliance is shown by way of example in Fig. 11, in which case the vibrator 24 is constructed in the form of a ring, through the aperture of whict the nozzle 22' extends. In this case the nozzle is preferably movable within certain limits with respect to the vibrator.

Fig. 12 shows diagrammatically a possible embodiment of a mixing and conveying apparatus for concrete (a concrete pump) which is afforded by the new process. Aggregate 26 is forced continuously by means of a worm 25 into a vessel 27 in which a current of cement paste is introduced counter to the direction of the pressure of the worm by means of nozzles 28 and the aggregate is simultaneously vibrated by means of a vibrator 29 connected with the vessel. The vessel is provided with a pump 30 for drawing off the air escaping from the aggregate. The paste-like liquid mixture formed in the vessel passes, still under the pressure of the worm and without loosing its fluid property, directly into a conduit 31 and through this conduit to the building site. Auxiliary vibrators 32 serve for maintaining the liquid property of the liquid in the tube if necessary.

Fundamentally an arrangement for conveying excavated material would be similarly constructed.

The new appliances are outstanding in comparison with those hitherto used due to their great simplicity and the economical consumption of liquid (cement paste or water).

It is obvious that once my new invention is disclosed many modifications and adaptations falling within the ambit thereof will readily occur to those skilled in the art. Accordingly, I intend my invention be limited only by the scope of the appended claims.

I claim:

1. A process for the production for building purposes of mixtures of liquids and loose materials consisting of solid granules, consisting of introducing a liquid into the loose material against the force of gravity on the material, and simultaneously vibrating the materials until a mixture is obtained which is completely permeated by the liquid, has a paste-like fluidity, and in which the granules settle to a minimum volume.

2. A process for the production for building purposes of mixtures of liquids and loose materials consisting of solid granules, comprising suspending in water additives chosen from the group of sealing media consisting of stone meal, clay and trass, introducing the water thus treated into the material against the force of gravity acting on the material, and simultaneously vibrating the material until a mixture is obtained which is completely permeated by the liquid, is water-resistant, has a paste-like fluidity, and in which the granules settle to a minimum volume.

3. A process for the production for building purposes of mixtures of liquids and loose materials consisting of solid granules, comprising introducing liquid binder into the loose material against the force of gravity acting on the material, and simultaneously vibrating the loose material until a mixture is obtained which is completely permeated by the binder, has a paste-like fluidity, and in which the granules settle to a minimum volume, the mixture being adapted to harden to a unitary whole due to the said addition of binders to the binder.

4. A process for the production for building purposes of mixtures of liquids and loose material consisting of solid granules, comprising introducing the solid granules into a building site, introducing liquid into the solid granules at a plurality of aligned points against the force of gravity acting on the granules, simultaneously vibrating the said granules in the region of an end one of the plurality of the aligned points of introduction of the liquid, thereby bringing the liquid upwardly through the granules on a sloping line, the liquid rising highest at the point of vibration, and after the liquid is brought adjacent the surface of the granules at the point of vibration, shutting off the flow of liquid at that point, vibrating the region adjacent the next inner point of introduction of the liquid, and introducing the liquid at still another point at the far end of the aligned points of introduction of the liquid, whereby, when the process is terminated, a mixture is obtained which is completely permeated by the liquid, has a paste-like fluidity, and in which the granules settle to a minimum volume, a solidification of the mixture to a compact body being effected by the said liquid.

5. A process for the production for building purposes of mixtures of liquids and loose materials consisting of solid granules, comprising introducing concrete aggregate into the space to be occupied, forcing cement paste into the aggregate against the force of gravity acting on the aggregate and simultaneously vibrating the aggregate until a concrete mixture of paste-like fluidity which is completely permeated by cement paste is obtained, the granules of which settle to a minimum volume, this fresh concrete mixture of paste-like fluidity, which completely fills the space to be filled, being left to harden.

6. A process for the production for building purposes of mixtures of liquids and loose materials consisting of solid granules, comprising introducing concrete aggregate into a space to be filled under water, forcing cement paste into the aggregate from the bottom thereof against the resultant force acting on the aggregate, and simultaneously vibrating the aggregate until a concrete mixture is obtained of paste-like fluidity which is completely permeated by cement paste the water being driven off by the paste, the granules of which mixture settle to a minimum volume, this fresh concrete mixture, of paste-like fluidity, which completely fills the space to be filled, being left to harden.

SERGEY STEUERMANN.